United States Patent
Ishikawa et al.

(10) Patent No.: US 12,450,050 B2
(45) Date of Patent: *Oct. 21, 2025

(54) SOFTWARE UPDATE PROGRAM FOR IN-VEHICLE DEVICES AND ASSOCIATED SERVER

(71) Applicant: TOYOTA JIDOSHA KABUSHIKI KAISHA, Toyota (JP)

(72) Inventors: Tomoyasu Ishikawa, Nagoya (JP); Sho Nakamura, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

This patent is subject to a terminal disclaimer.

(21) Appl. No.: 18/179,749

(22) Filed: Mar. 7, 2023

(65) Prior Publication Data

US 2023/0205515 A1    Jun. 29, 2023

Related U.S. Application Data

(63) Continuation of application No. 17/243,896, filed on Apr. 29, 2021, now Pat. No. 11,625,233, which is a
(Continued)

(30) Foreign Application Priority Data

Jul. 30, 2018 (JP) ................................. 2018-142484

(51) Int. Cl.
- *G06F 8/654* (2018.01)
- *H04L 67/00* (2022.01)
- *H04W 4/44* (2018.01)

(52) U.S. Cl.
CPC .............. *G06F 8/654* (2018.02); *H04L 67/34* (2013.01); *H04W 4/44* (2018.02)

(58) Field of Classification Search
CPC ... G06F 8/654; G06F 8/70; G06F 8/10; G06F 40/284; G06F 21/577; G06F 2221/033; H04W 4/44; H04L 67/34
(Continued)

(56) References Cited

U.S. PATENT DOCUMENTS

| 5,689,825 A | 11/1997 | Averbuch et al. |
| 7,225,066 B2 | 5/2007 | Yasuda |

(Continued)

FOREIGN PATENT DOCUMENTS

| CN | 104539668 A | 4/2015 |
| CN | 105793824 A | 7/2016 |

(Continued)

OTHER PUBLICATIONS

Azizian et al, " Vehicle Software Updates Distribution with SDN and Cloud Computing", IEEE, 74-79 (Year: 2017).*
(Continued)

*Primary Examiner* — Anil Khatri
(74) *Attorney, Agent, or Firm* — Oliff PLC

(57) ABSTRACT

A program update system includes a vehicle including a plurality of in-vehicle devices, and a server provided outside the vehicle. Each of the in-vehicle devices of the vehicle includes a storage unit configured to store one or more programs, an in-vehicle device communication unit configured to perform communication with the server, and an update execution unit configured to update the programs stored in the storage unit. The server includes a server communication unit configured to perform communication with each of the in-vehicle devices, and an update management unit configured to specify the in-vehicle device to be updated in a set of the in-vehicle devices and a program to be updated and execute update processing that makes the server communication unit transmit update data for updating
(Continued)

the program to be updated to the in-vehicle device to be updated.

6 Claims, 3 Drawing Sheets

Related U.S. Application Data continuation of application No. 16/436,300, filed on Jun. 10, 2019, now Pat. No. 11,023,223.

(58) Field of Classification Search
USPC .................................................. 717/168–174
See application file for complete search history.

(56) References Cited

U.S. PATENT DOCUMENTS

| | | | |
|---|---|---|---|
| 7,340,737 B2 | 3/2008 | Ghercioiu et al. | |
| 7,366,589 B2* | 4/2008 | Habermas | G06F 8/65 701/1 |
| 7,506,309 B2 | 3/2009 | Schaefer | |
| 7,693,612 B2 | 4/2010 | Bauchot et al. | |
| 7,957,849 B2 | 6/2011 | Reichart et al. | |
| 7,966,111 B2 | 6/2011 | Moinzadeh et al. | |
| 8,095,301 B2 | 1/2012 | Kawamura | |
| 8,140,358 B1 | 3/2012 | Ling et al. | |
| 8,185,253 B2 | 5/2012 | Teramura et al. | |
| 8,418,167 B2 | 4/2013 | Meller et al. | |
| 8,533,708 B2 | 9/2013 | Kamada et al. | |
| 8,561,054 B2 | 10/2013 | Smirnov et al. | |
| 8,607,215 B2 | 12/2013 | Natsume | |
| 8,725,135 B2 | 5/2014 | Weyl et al. | |
| 8,942,888 B2 | 1/2015 | Garrett et al. | |
| 9,104,537 B1* | 8/2015 | Penilla | G06Q 10/20 |
| 9,274,785 B2 | 3/2016 | Jung | |
| 9,288,270 B1* | 3/2016 | Penilla | H04L 67/141 |
| 9,361,090 B2* | 6/2016 | Elzein | H04W 4/80 |
| 9,436,456 B2 | 9/2016 | Danne et al. | |
| 9,575,743 B1* | 2/2017 | Chun | G06F 8/654 |
| 9,626,175 B2* | 4/2017 | Davey | G06F 8/65 |
| 9,697,503 B1 | 7/2017 | Penilla et al. | |
| 9,722,781 B2* | 8/2017 | Smereka | G06F 21/572 |
| 9,858,064 B2 | 1/2018 | Mitchell et al. | |
| 9,946,531 B1* | 4/2018 | Fields | A61B 5/6893 |
| 10,061,574 B2 | 8/2018 | Mueller et al. | |
| 10,140,110 B2* | 11/2018 | Vangelov | G06F 8/65 |
| 10,353,696 B2* | 7/2019 | Willis | H04L 67/34 |
| 10,365,912 B2 | 7/2019 | Quin et al. | |
| 10,416,670 B1 | 9/2019 | Fields et al. | |
| 10,447,483 B1 | 10/2019 | Su | |
| 10,573,093 B2* | 2/2020 | Breed | G07C 5/008 |
| 10,599,418 B2* | 3/2020 | Kiyama | H04L 67/12 |
| 10,613,536 B1 | 4/2020 | Lathia et al. | |
| 10,630,538 B2 | 4/2020 | Kim et al. | |
| 10,666,767 B1 | 5/2020 | Floyd et al. | |
| 10,795,661 B2 | 10/2020 | Hayashidera | |
| 11,356,425 B2* | 6/2022 | Kruger | H04L 63/0435 |
| 11,449,327 B2* | 9/2022 | David | G06F 11/1433 |
| 11,507,367 B2 | 11/2022 | Shiu et al. | |
| 11,556,329 B2* | 1/2023 | Thomasma | H04L 67/12 |
| 11,614,930 B2* | 3/2023 | Abe | H04W 4/44 717/168 |
| 11,656,771 B2* | 5/2023 | Harata | G06F 3/0679 711/154 |
| 11,704,107 B2* | 7/2023 | McFarland, Jr. | H04L 12/12 717/168 |
| 11,709,666 B2* | 7/2023 | Harata | G06F 8/65 717/172 |
| 11,740,885 B1* | 8/2023 | Fields | G05D 1/0278 717/172 |
| 11,782,691 B2* | 10/2023 | Sangameswaran | H04L 67/34 717/173 |
| 11,847,440 B2* | 12/2023 | Taki | G06F 8/61 |
| 11,868,755 B2* | 1/2024 | Vladimerou | G06F 8/65 |

| | | | |
|---|---|---|---|
| 2012/0167071 A1 | 6/2012 | Paek | |
| 2016/0170775 A1 | 6/2016 | Rockwell et al. | |
| 2016/0378457 A1 | 12/2016 | Adachi et al. | |
| 2017/0139778 A1 | 5/2017 | Kito et al. | |
| 2017/0192770 A1 | 7/2017 | Ujiie et al. | |
| 2017/0262277 A1 | 9/2017 | Endo et al. | |
| 2017/0329599 A1 | 11/2017 | Choi | |
| 2019/0108014 A1 | 4/2019 | Nakamura et al. | |
| 2019/0286454 A1 | 9/2019 | Sano | |

FOREIGN PATENT DOCUMENTS

| | | |
|---|---|---|
| CN | 106796538 A | 5/2017 |
| DE | 10 2012 023 648 A1 | 5/2014 |
| DE | 10 2015 121 091 A1 | 6/2016 |
| DE | 10 2016 224 501 A1 | 11/2017 |
| DE | 11 2017 005 462 T5 | 7/2019 |
| JP | 2011-148398 A | 8/2011 |
| JP | 2012-171386 A | 9/2012 |
| JP | 2017-097620 A | 6/2017 |
| JP | 2017-097851 A | 6/2017 |
| JP | 2017-157004 A | 9/2017 |
| JP | 2017-167646 A | 9/2017 |
| JP | 2017-220092 A | 12/2017 |
| JP | 6569771 B2 | 9/2019 |

OTHER PUBLICATIONS

Steger et al, "An Efficient and Secure Automotive Wireless Software Update Framework", IEEE, pp. 2181-2193 (Year: 2018).*
Aust, "Vehicle Update Management in Software Defined Vehicles", IEEE, pp. 1-3 (Year: 2022).*
Onuma et al, "ECU Software Updating in Future Vehicle Networks", IEEE, pp. 1-6 (Year: 2017).*
Xu et al, "Research on the Design of Software Upgrade for Special Vehicles Based on OTA Technology", IEEE, pp. 1-5 (Year: 2024).*
Plappert et al, "Secure and Lightweight Over-the-Air Software Update Distribution for Connected Vehicles", ACM, pp. 1-15 (Year: 2025).*
Azizian et al, "Vehicle Software Updates Distribution with SDN and Cloud Computing", IEEE, pp. 74-79 (Year: 2017).
Brown et al, "An Update on Software Updates",Queue, pp. 10-11 (Year: 2005).
Onuma et al, "ECU Software Updating in Future Vehicle Networks", IEEE, pp. 35-40 (Year: 2017).
Jul. 7, 2020 Office Action issued in U.S. Appl. No. 16/436,300.
Nov. 5, 2020 Office Action issued in U.S. Appl. No. 16/436,300.
Feb. 3, 2021 Notice of Allowance issued in U.S. Appl. No. 16/436,300.
Baza et al, "Blockchain-based Firmware Update Scheme Tailored for Autonomous Vehicles", IEEE, pp. 1-7 (Year: 2019).
Ghosal et al, "STRIDE: Scalable and Secure Over-The-Air Software Update Scheme for Autonomous Vehicles", IEEE, pp. 1-6 (Year: 2020).
Kim et al, "ECU Software Updating Scenario Using OTA Technology through Mobile Communication Network", IEEE, pp. 67-72 (Year: 2018).
Stevic et al, "IoT-based Software Update Proposal for Next Generation Automotive Middleware Stacks", IEEE, pp. 1-4 (Year: 2018).
Gandhi et al, "An approach for secure software update in Infotainment system", ACM, pp. 127-131 (Year: 2017).
Teraoka et al, "Incremental Update Method for Vehicle Microcontrollers", IEEE, pp. 1-2 (Year: 2017).
Nilsson et al, "Secure Firmware Updates over the Air in Intelligent Vehicles", IEEE, pp. 380-384 (Year: 2008).
Steger et al, "An Efficient and Secure Automotive Wireless Software Update Framework", IEEE, pp. 81-2193 (Year: 2018).
Aug. 3, 2022 Office Action issued in U.S. Appl. No. 17/243,896.
Dec. 9, 2022 Notice of Allowance issued in U.S. Appl. No. 17/243,896.
SecUp: Secure and Efficient Wireless Software Updates for Vehicles, IEEE, pp. 628-636 (Year: 2016).
Mierau et al, "A Distributed Approach to the Integration of Electric Vehicles into Future Smart Grids", IEEE, pp. 1-7 (Year: 2012).

(56) References Cited

OTHER PUBLICATIONS

Goshal et al, "STRIDE: Scalable and Secure Over-The-Air Software Update Scheme for Autonomous Vehicles", IEEE, pp. 1-6 (Year : 2020).

* cited by examiner

SOFTWARE UPDATE PROGRAM FOR IN-VEHICLE DEVICES AND ASSOCIATED SERVER

INCORPORATION BY REFERENCE

This application is a continuation of U.S. application Ser. No. 17/243,896, filed on Apr. 29, 2021, which is a continuation of U.S. Application 16/436,300, filed on Jun. 10, 2019, which claims priority to Japanese Patent Application No. 2018-142484 filed on Jul. 30, 2018, the specification, drawings, claims, and abstract of each of which are incorporated herein by reference in their entirety.

BACKGROUND

1. Technical Field

The present disclosure relates to a program update system that updates a program of equipment mounted in a vehicle, a program update server, and a vehicle.

2. Description of Related Art

In a vehicle, a plurality of in-vehicle devices, called an electronic control unit (ECU), is mounted. Each of the in-vehicle devices, such as the ECU, includes a controller, such as one or more central processing units (CPUs), and a storage unit that stores one or more programs to be executed by the controller. For improvement of functions of the in-vehicle device, updating the programs has been suggested. In particular, a technique in which a vehicle receives data for a program update from an external server through wireless communication such that the programs can be updated even though the vehicle does not visit a maintenance facility or the like has been suggested.

Japanese Unexamined Patent Application Publication No. 2011-148398 (JP 2011-148398 A) discloses that a specific ECU functions as a master ECU and performs communication with a server to update the programs of the master ECU or other slave ECUs.

SUMMARY

In JP 2011-148398 A, the master ECU holds identification information of the master ECU and the slave ECUs and version information of a control program. The master ECU transmits the identification information and the version information to the server, and when there are update files, the server transmits the identification information and the update files to the master ECU. When an ECU corresponding to the identification information is the master ECU, the master ECU updates the control program of the master ECU based on the update files. When the ECU corresponding to the identification information is a slave ECU, the master ECU transmits the update files to the slave ECU, and the slave ECU updates the control program based on the update files.

In the method of JP 2011-148398 A, the master ECU needs to execute processing depending on an ECU configuration unique to the vehicle, in which the master ECU is mounted. For this reason, in order to respond to a different ECU configuration, a master ECU having a different setting needs to be prepared for each vehicle type or model and a workload is large.

The disclosure provides a program update system, a program update server, and a vehicle capable of suppressing a workload in preparing a master ECU corresponding to a unique in-vehicle device configuration for each vehicle.

A first aspect of the disclosure relates to a program update system. The program update system includes a vehicle and a server. The vehicle includes a plurality of in-vehicle devices. The server is provided outside the vehicle. Each of the in-vehicle devices of the vehicle includes a storage unit, an in-vehicle device communication unit, and an update execution unit. The storage unit is configured to store one or more programs. The in-vehicle device communication unit is configured to perform communication with the server. The update execution unit is configured to update the programs stored in the storage unit based on communication with the server using the in-vehicle device communication unit. The server includes a server communication unit and an update management unit. The server communication unit is configured to perform communication with each of the in-vehicle devices. The update management unit is configured to specify the in-vehicle device to be updated in a set of the in-vehicle devices and a program to be updated based on information received from each of the in-vehicle devices through communication using the server communication unit and execute update processing that makes the server communication unit transmit update data for updating the program to be updated to the in-vehicle device to be updated.

According to the first aspect, each of the in-vehicle devices performs communication with the server to update the programs of the in-vehicle device, whereby an advanced master function of managing the configurations of the in-vehicle devices or the versions of the programs may not be provided in the vehicle. Since the server specifies the in-vehicle device to be updated for the set of all of the in-vehicle devices of the vehicle, for example, it is possible to suppress omission of a synchronous update, or the like.

In the program update system according to the first aspect, the update execution unit may be configured to transmit information representing a classification and a version of each program stored in the storage unit from the in-vehicle device communication unit to the server.

In the program update system according to the first aspect, the server communication unit may be configured to perform communication with a terminal device outside the vehicle. The update management unit may be configured to make the server communication unit transmit information relating to the update processing to be displayed on a display screen of the terminal device to the terminal device.

According to the first aspect, even though the user does not board the vehicle, it is possible to allow the user to issue an instruction for program update processing or confirm progress statuses using a smartphone or the like. Since the server may respond to a communication system, a display system, or the like of the terminal device, there is no need for each vehicle to respond to the communication system, the display system, or the like of the terminal device.

A second aspect of the disclosure relates to a program update server that performs communication with a vehicle including a plurality of in-vehicle devices. The program update server includes a communication unit and an update management unit. The communication unit is configured to perform communication with each of the in-vehicle devices. The update management unit is configured to specify the in-vehicle device to be updated in a set of the in-vehicle devices and a program to be updated based on information received from each of the in-vehicle devices and execute update processing that makes the communication unit transmit update data for updating the program to be updated to the in-vehicle device to be updated.

According to the second aspect, since the server sequentially performs communication with each of the in-vehicle devices, and specifies the in-vehicle device to be updated for the set of all of the in-vehicle devices of the vehicle without exception, it is possible to update the program even though an advanced master function of managing the configurations of the in-vehicle devices or the versions of the programs is not provided in the vehicle.

A third aspect of the disclosure relates to a vehicle. The vehicle includes a plurality of in-vehicle devices. Each of the in-vehicle devices includes a storage unit, a communication unit, and an update execution unit. The storage unit is configured to store one or more programs. The communication unit is configured to perform communication with an external server. The update execution unit is configured to update the programs stored in the storage unit based on communication with the external server using the communication unit.

According to the third aspect, each of the in-vehicle devices sequentially performs communication with the server to update the program of the in-vehicle device, whereby it is possible to update the program even though an advanced master function of managing the configurations of the in-vehicle devices or the versions of the programs is not provided in the vehicle.

As described above, according to the aspects of the disclosure, it is possible to provide a program update system, a program update server, and a vehicle having a suppressed workload in responding to the in-vehicle device configuration of each vehicle, in which the above-described master function is provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

Figure 1:
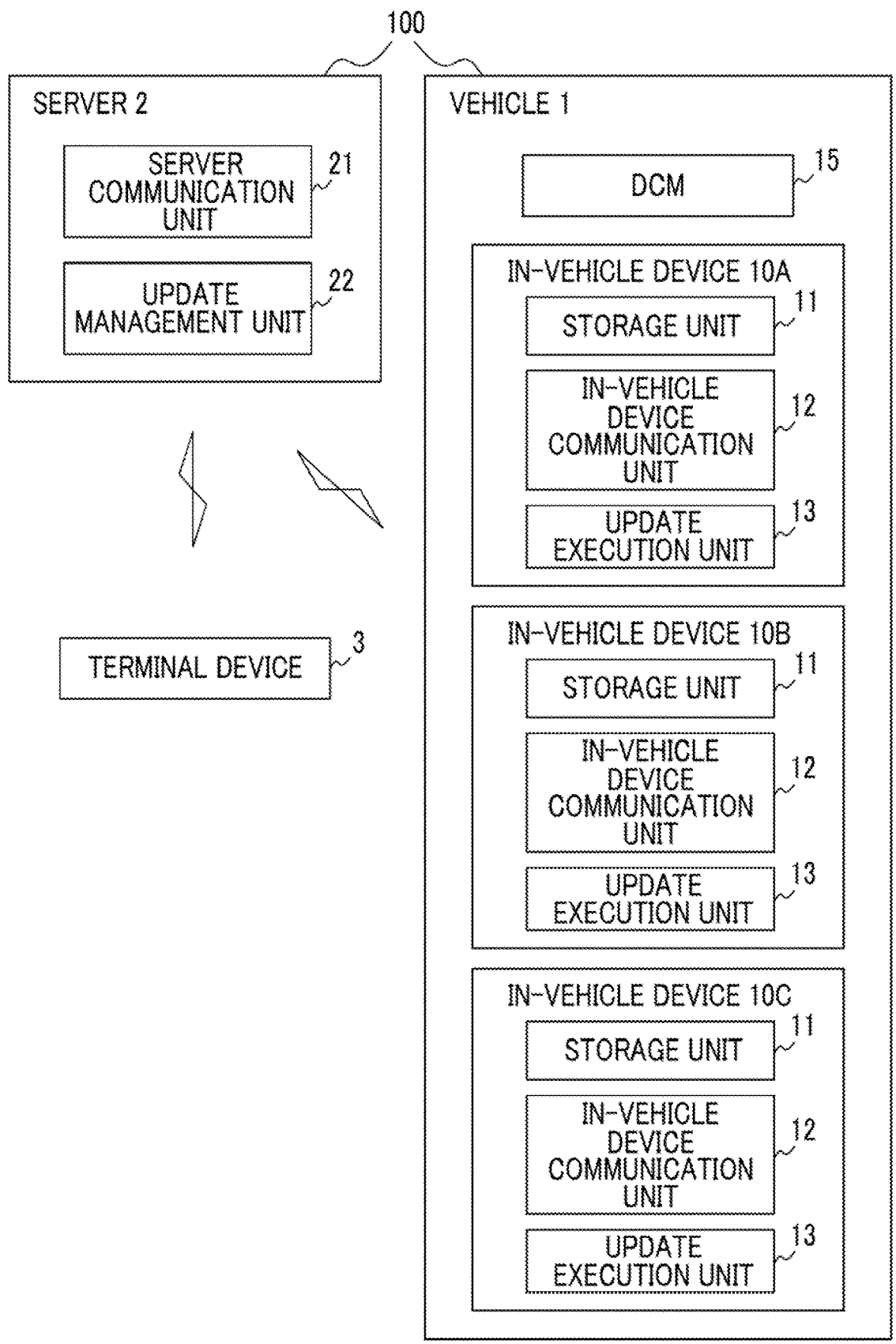
FIG. 1 is a diagram showing functional blocks of a program update system according to an embodiment of the disclosure.

In a program update system according to an embodiment of the disclosure, each of in-vehicle devices sequentially performs communication with a server to update programs of the in-vehicle device. With this, it is possible to reduce a workload in providing an advanced master function of managing the configurations of the in-vehicle devices or the versions of the programs in a vehicle. Since the server specifies an in-vehicle device to be updated for the set of all of the in-vehicle devices of the vehicle, for example, it is possible to suppress omission of a synchronous update, or the like. The server can perform communication with a smartphone or the like, and the user can issue an instruction for program update processing or confirm progress statuses even outside the vehicle. Since the server may respond to a communication system with the smartphone, a display system, or the like, a workload of each vehicle in responding to the communication system, the display system, or the like does not occur.

Embodiment

Hereinafter, an embodiment of the disclosure will be described in detail referring to the drawings.

Configuration

FIG. 1 shows functional blocks of a configuration example of a program update system 100 and a terminal device 3 according to the embodiment. The program update system 100 includes a vehicle 1 and a server 2. Although the vehicle 1 includes, as an example, a data communication module (DCM) 15 that performs wireless communication, and three in-vehicle devices 10A, 10B, 10C, the number of in-vehicle devices is not limited to three. The server 2 includes a server communication unit 21 and an update management unit 22.

Each of the in-vehicle devices 10A, 10B, 10C of the vehicle 1 includes a storage unit 11, an in-vehicle device communication unit 12, and an update execution unit 13. In the in-vehicle devices 10A, 10B, 10C, the storage unit 11 stores one or more programs that are executed by a controller (CPU) (not shown). The in-vehicle device communication unit 12 performs communication with the server 2 using a wireless communication function of the DCM 15. The update execution unit 13 makes the storage unit 11 store a new program based on update data received from the server 2 by the in-vehicle device communication unit 12 to update the programs. The functions of the in-vehicle device communication unit 12 and the update execution unit 13 can be executed by the controller. Not all of the in-vehicle devices of the vehicle 1 may be an in-vehicle device in which the programs can be updated.

The server communication unit 21 of the server 2 performs communication with the vehicle 1 and the terminal device 3. The update management unit 22 specifies an in-vehicle device to be updated among the in-vehicle devices 10A, 10B, 10C of the vehicle 1 through communication with the vehicle 1 using the server communication unit 21, and specifies a program to be updated as described below. The update management unit 22 performs control such that the server communication unit 21 transmits update data for use in updating the program to be updated to the in-vehicle device to be updated.

The terminal device 3 is an information processing device that has a communication function with the server 2, and includes a display screen, on which information relating to the program update processing is displayed, and an input unit. The terminal device 3 is, for example, a general-purpose information processing device, such as a smartphone or tablet type equipment to be typically carried with a user of the vehicle 1, or personal computer. The terminal device 3 may be a device that is mounted in the vehicle 1, such as a car navigation device. In this way, the terminal device 3 is not limited in terms of a classification, the number of terminal device, and a position.

Processing

Figure 2:
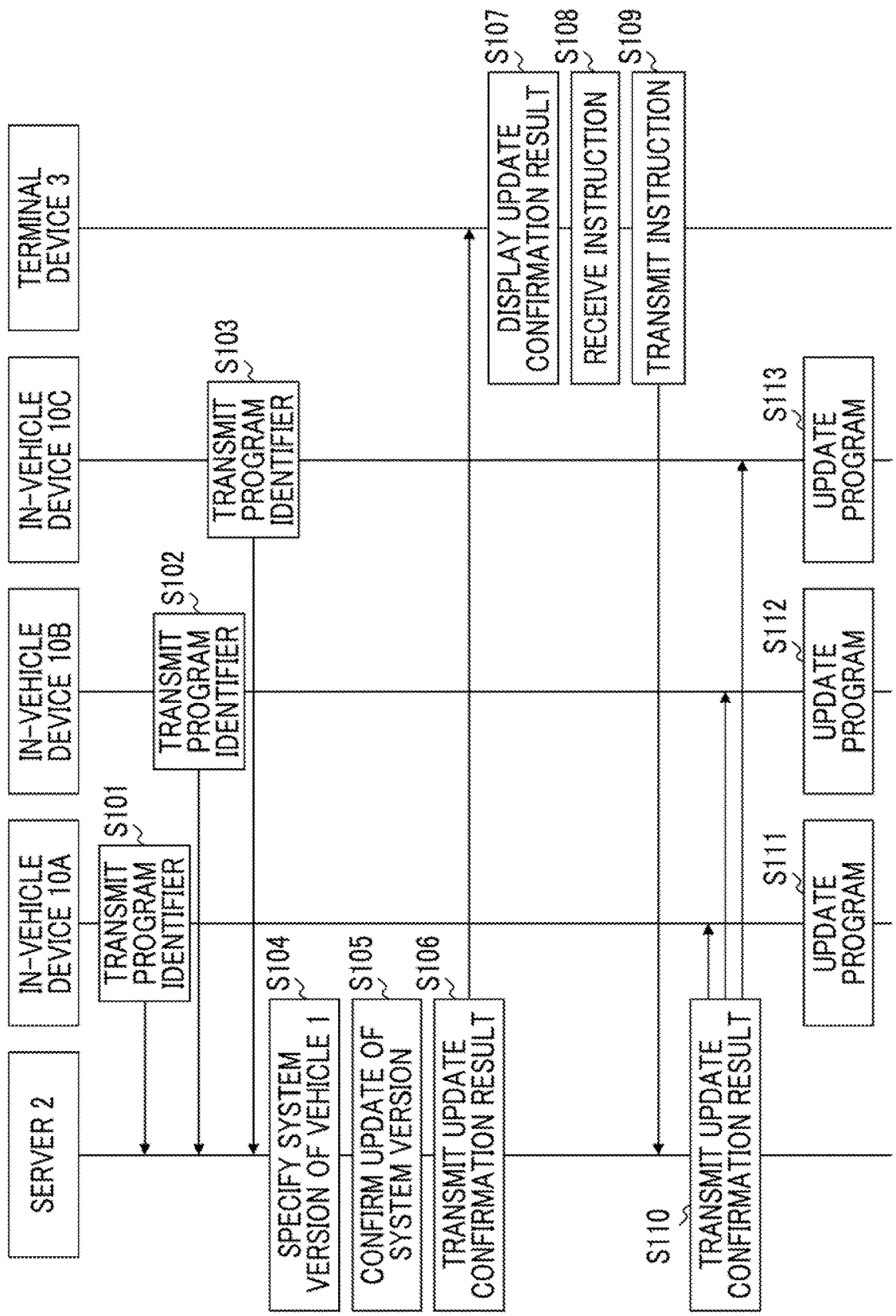
FIG. 2 is a sequence diagram showing an example of processing according to the embodiment of the disclosure.
Figure 3:
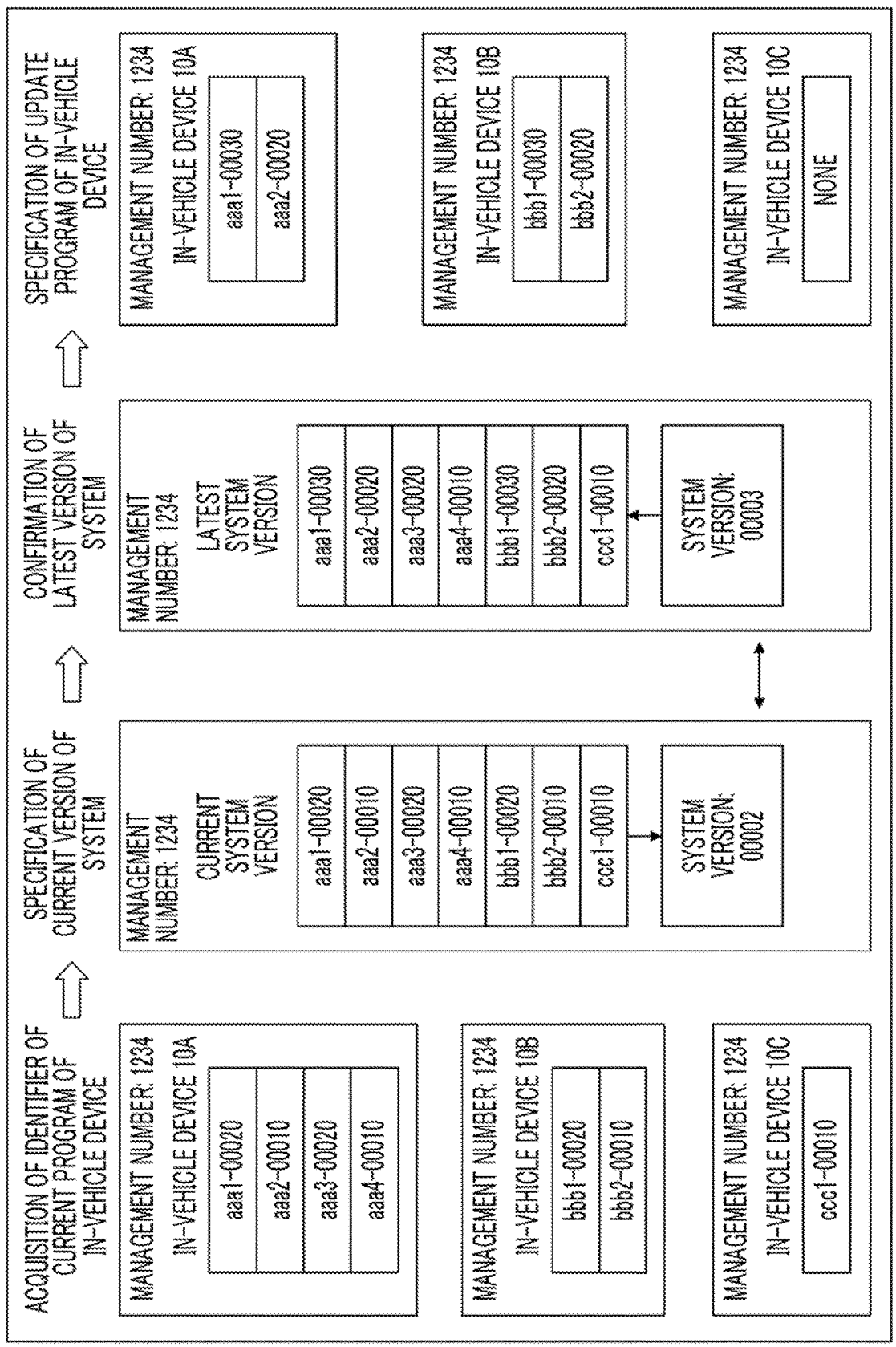
FIG. 3 is a diagram showing an example of data for use in the processing according to the embodiment of the disclosure.

FIG. 2 is a sequence diagram showing processing that is executed by the program update system 100. FIG. 3 shows an example of data for use in the processing. A processing content will be described referring to FIGS. 2 and 3. The processing may be executed, for example, regularly or may be executed when the user issues an instruction to the terminal device 3 as described below.

(Step S101): The update execution unit 13 of the in-vehicle device 10A of the vehicle 1 transmits information, such as identifiers, for representing classifications and versions of the programs stored in the storage unit 11 of the in-vehicle device 10A from the in-vehicle device communication unit 12 to the server 2 through the DCM 15 of the vehicle 1.

(Step S102): Similarly, the update execution unit 13 of the in-vehicle device 10B of the vehicle 1 transmits information, such as identifiers, for representing classifications and versions of the programs stored in the storage unit 11 of the in-vehicle device 10B from the in-vehicle device communication unit 12 to the server 2 through the DCM 15 of the vehicle 1.

(Step S103): Similarly, the update execution unit 13 of the in-vehicle device 10C of the vehicle 1 transmits information, such as identifiers, for representing classifications and versions of the programs stored in the storage unit 11 of the in-vehicle device 10C from the in-vehicle device communication unit 12 to the server 2 through the DCM 15 of the vehicle 1. The order of Steps S101 to S103 is not limited.

In "acquisition of identifier of current program of in-vehicle device" of FIG. 3, an example where the server 2 acquires information from each of the in-vehicle devices 10A, 10B, 10C is shown. The update management unit 22 of the server 2 acquires, as an example, information representing the classifications and the versions of four programs, two programs, or one program and unique management numbers for identifying a series of processing in the sequence from the in-vehicle devices 10A, 10B, 10C through the server communication unit 21, respectively.

(Step S104): The update management unit 22 of the server 2 specifies a system version of the set of the in-vehicle devices 10A, 10B, 10C of the vehicle 1 based on the identifiers of the current programs in the set of the in-vehicle devices 10A, 10B, 10C of the vehicle 1. The specification can be performed, for example, when the server 2 stores the correspondence between the in-vehicle devices 10A, 10B, 10C and the versions of the programs for each system version and compares the correspondence with the current versions of the programs of the in-vehicle devices 10A, 10B, 10C. In "specification of current version of system" of FIG. 3, an example of data representing the specified current system version is shown.

(Step S105): The update management unit 22 of the server 2 confirms an updated system version to the current system version. Information of the updated system version and an update program are provided to the server 2, for example, each time an update is available from a provision source of a program. In "confirmation of latest version of system" of FIG. 3, an example of data representing the updated system version is shown. In the example, updated programs are provided to two programs among the programs of the in-vehicle device 10A, and two programs among the programs of the in-vehicle device 10B.

(Step S106): The update management unit 22 of the server 2 makes the server communication unit 21 transmit a confirmation result of the updated system version to the terminal device 3.

(Step S107): The terminal device 3 receives the confirmation result of the updated system version and displays the confirmation result of the updated system version to the user. When there is no updated system version, the terminal device 3 displays the result that there is no update system version, and the sequence ends.

(Step S108): The terminal device 3 receives, from the user, an instruction representing whether or not to execute the update of the programs.

(Step S109): The terminal device 3 transmits the instruction received from the user to the server 2.

(Step S110): When the instruction of the user is an instruction not to execute the update of the programs, the update management unit 22 of the server 2 ends the processing. When the instruction of the user is an instruction to execute the update of the programs, the update management unit 22 of the server 2 makes the server communication unit 21 transmit update data needed for updating the programs to the in-vehicle device having the storage unit 11, which stores the programs to be updated, among the in-vehicle devices 10A, 10B, 10C. In the example shown in "specification of update program of in-vehicle device" of FIG. 3, update data of the two programs is transmitted to the in-vehicle device 10A, and update data of the two programs is transmitted to the in-vehicle device 10B; however, since a program to be updated is absent in the in-vehicle device 10C, update data is not transmitted to the in-vehicle device 10C.

(Step S111): When the in-vehicle device communication unit 12 receives update data through the DCM 15, the update execution unit 13 of the in-vehicle device 10A of the vehicle 1 updates the programs stored in the storage unit 11 of the in-vehicle device 10A based on the update data and updates information representing the versions of the programs.

(Step S112): Similarly, when the in-vehicle device communication unit 12 receives update data through the DCM 15, the update execution unit 13 of the in-vehicle device 10B of the vehicle 1 updates the programs stored in the storage unit 11 of the in-vehicle device 10B based on the update data and updates information representing the versions of the programs.

(Step S113): Similarly, when the in-vehicle device communication unit 12 receives update data through the DCM 15, the update execution unit 13 of the in-vehicle device 10C of the vehicle 1 updates the program stored in the storage unit 11 of the in-vehicle device 10C based on the update data and updates information representing the version of the program. In the example shown in "specification of update program of in-vehicle device" of FIG. 3, since an update is not available to the program of the in-vehicle device 10C, the processing is not executed.

With the above, the sequence ends. The above processing can be appropriately changed and executed. For example, after the execution of Steps S111 to S113, the in-vehicle devices 10A, 10B, 10C may give a completion notification of the update of the programs to the server 2, and the server 2 may transmit the completion notification to the terminal device 3 and may notify the user of the completion. When the server 2 transmits the progress status of each step to the terminal device 3 in parallel with the progress of the update processing, it is possible to notify the user of the progress status. The execution of the above sequence may be started when the terminal device 3 receives the execution instruction from the user and transmits the execution instruction to the server 2, and the server 2 requests the in-vehicle devices 10A, 10B, 10C to execute the processing of Steps S101 to S103.

Effects

In the embodiment, the in-vehicle devices 10A, 10B, 10C sequentially transmit the classifications and the versions of the programs of the in-vehicle devices 10A, 10B, 10C to the server 2, and the system version of each vehicle can be specified on the server 2 side. Since the storage and the management of the system version may be performed in a batch for each vehicle type or model on the server 2 side, and in-vehicle device having an advanced master function of acquiring and managing the configurations of the in-vehicle devices and the classifications and the versions of the programs of each vehicle is not needed on the vehicle side, it is possible to significantly reduce a workload in responding to the configurations of the in-vehicle devices and the classifications and the versions of the programs. Adjustment of communication timing between the in-vehicle devices 10A, 10B, 10C and the server 2 can be implemented, for example, by providing a simple communication control function in the vehicle 1. Any one of the in-vehicle devices 10A, 10B, 10C may operate as a simple master having a minimum communication control function.

The server 2 manages the versions in a system version unit of the set of all of the in-vehicle devices 10A, 10B, 10C and confirms the presence or absence of the update program. For this reason, for example, even when the programs of a plurality of in-vehicle devices are related to one another, and a program update needs to be executed synchronously, it is desirable to execute an update without omission of a synchronous update.

In the related art, confirmation of progress statuses of the update processing of the programs or reception of an update instruction from the user before the execution of the update processing may be performed, for example, by a specific terminal device, such as a navigation device or the like fixedly provided in the vehicle and a master function of the vehicle. In contrast, in the embodiment, the server 2 can perform communication not only with the navigation device fixedly provided in the vehicle but also with a terminal device 3 not fixedly provided in the vehicle, such as a smartphone or a personal computer. For this reason, even though the user does not board the vehicle, it is possible to allow the user to issue an instruction for the program update processing or to confirm the progress statuses, and to improve user's convenience.

The server 2 may respond to a communication system, a display system, or the like of each terminal device 3, and there is no need for each vehicle to respond to the communication system, the display system, or the like of each terminal device 3.

As described above, in the program update system according to the embodiment of the disclosure, it is possible to suppress a workload in manufacturing a master ECU corresponding to the in-vehicle device configuration of each vehicle to reduce costs of the vehicle or to allow an update instruction or an update status confirmation from various terminal devices, and to improve user's convenience.

Although the embodiment of the disclosure has been described above, the disclosure can be regarded as a program update system, a program update server, a vehicle, a program update method that is executed by each unit of the server or the vehicle, a program update program, a non-transitory computer-readable recording medium storing the program update program, and the like.

The disclosure is useful for a program update system, a program update server, and a vehicle that update programs of in-vehicle devices or the like.

What is claimed is:

1. An information processing apparatus comprising a processor configured to:
electronically communicate with a server to receive a transmission with information indicating that an update of a program in a vehicle associated with the information processing apparatus is available;
accept an instruction to update the program in the vehicle from a user of the vehicle after the information processing apparatus receives the information;
transmit the instruction to update the program to the server; and
receive a transmission from the server, in parallel with an update processing of the program in the vehicle, indicating a progress status of the update processing when the information processing apparatus accepts the instruction to update,
wherein the information processing apparatus is not fixed in the vehicle.

2. The information processing apparatus according to claim 1, further comprising a display, wherein the processor is configured to cause the display to display information related to the information received by the information processing apparatus.

3. The information processing apparatus according to claim 1, wherein the processor is further configured to notify the user of the vehicle the progress status of the update processing received by the information processing apparatus.

4. The information processing apparatus according to claim 1, wherein the information processing apparatus is a smartphone or a tablet device.

5. A method executed by a processor of an information processing apparatus, the method comprising:
electronically communicating with a server to receive a transmission with information indicating that an update of a program in a vehicle associated with the information processing apparatus is available;
accepting an instruction to update the program in the vehicle from a user of the vehicle after the information is received;
transmitting the instruction to update the program to the server; and
receiving a transmission from the server, in parallel with an update processing of the program in the vehicle, indicating a progress status of the update processing when the instruction to update is accepted,
wherein the information processing apparatus is not fixed in the vehicle.

6. A non-transitory storage medium storing instructions that are executable by a processor of an information processing apparatus to perform functions comprising:
electronically communicating with a server to receive a transmission with information indicating that an update of a program in a vehicle associated with the information processing apparatus is available;
accepting an instruction to update the program in the vehicle from a user of the vehicle after the information is received;
transmitting the instruction to update the program to the server; and receiving a transmission from the server, in parallel with an update processing of the program in the vehicle, indicating a progress status of the update processing when the instruction to update is accepted, wherein the information processing apparatus is not fixed in the vehicle.

\* \* \* \* \*